(No Model.)
W. VOGLER.
CONDUIT FOR ELECTRIC WIRES.
No. 460,607. Patented Oct. 6, 1891.
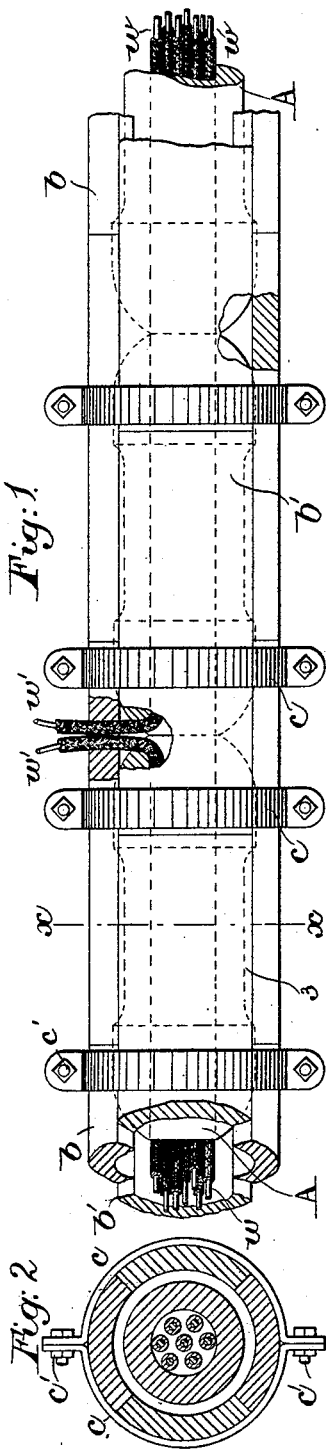
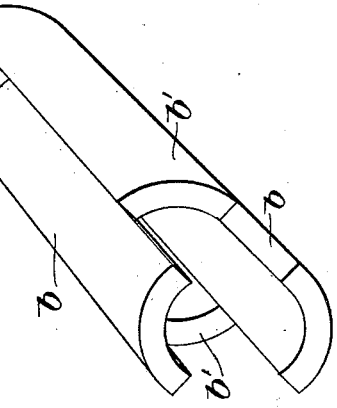
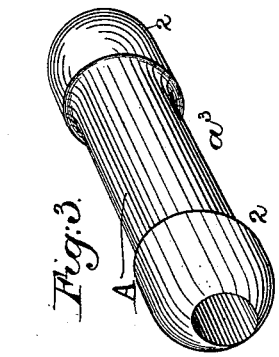
Witnesses.
Edward F Allen.
Fred S. Greenleaf.
Inventor:
William Vogler
by Lemby & Gregory attys.

UNITED STATES PATENT OFFICE.

WILLIAM VOGLER, OF SOMERVILLE, MASSACHUSETTS.

CONDUIT FOR ELECTRIC WIRES.

SPECIFICATION forming part of Letters Patent No. 460,607, dated October 6, 1891.

Application filed February 25, 1891. Serial No. 382,713. (No model.)

*To all whom it may concern:*

Be it known that I, WILLIAM VOGLER, of Somerville, county of Middlesex, State of Massachusetts, have invented an Improvement in Conduits for Electric Wires, of which the following description, in connection with the accompanying drawings, is a specification, like letters and figures on the drawings representing like parts.

This invention has for its object the production of a novel and efficient conduit capable of being laid quickly and at the minimum cost.

My invention consists in a conduit composed of a series of sections abutted together end to end, and a series of surrounding shields held in place thereon by clamps; also, in a conduit composed of a series of sections cut away externally to form air-spaces and abutted together end to end, and a series of surrounding shields held in place thereon by clamps; also, in a conduit composed of a series of sections abutted together from end to end, and a series of surrounding shields surrounding the sections and having their ends laid to break joint and held in place thereon by clamps; also, in a conduit composed of a series of internal sections and surrounding external sections, and a series of non-communicating air-cells formed between said sections.

Figure 1 is a plan view, partially broken out, of a conduit embodying my invention, two wires being shown as led out of the side of the conduit, as may be done, if desired; Fig. 2, a section in the line $x$. Fig. 3 shows one of the conduits, and Fig. 4 shows one set of shields.

The sections A are shown separately in Fig. 3 and by dotted and full lines in Fig. 1, and are composed, preferably, of wood or wooden spools having, as I prefer, their bodies reduced in diameter, as at $a^3$, Fig. 3. The wires $w$, one or more, as desired, and preferably properly insulated, have a series of thin sections strung on them, or the wires may be drawn through the sections after they are laid. These sections of insulating material are abutted substantially end to end, and are thereafter surrounded by the shields or segments $b$ $b'$, (shown as concavo-convex wooden boards substantially of even length,) which are laid outside of and so as to embrace, protect, and shield the sections, the shields $b$ $b'$ being so laid as to project alternately one beyond the other, so as to break joints and shield or cover the joints between the adjacent sections. These shields are held firmly in place about the sections by means of clamps $c$ in one or more pieces, and preferably having ears to receive bolts $c'$, by which to cause the clamp to be drawn very taut about the sections. The shields stiffen the conduit. The shields contact with the swells 2 of the sections A, and the reduced portion $a^3$ between said swells 2 forms a dead or tight annular air-space 3, (see dotted lines, Fig. 1,) to aid in keeping the conduit dry, said air-space preventing condensation of moisture from the atmosphere. As each internal section A, co-operating with the shields or external sections, forms an air-space, the conduit as an entirety will present a series of non-communicating air-spaces from end to end. At desired points wires may be drawn out from between the ends of the sections, as at $w'$ $w'$, to have other wires running to buildings connected thereto. The wood of the sections may be treated in any usual manner to make it impervious to water or to increase its durability under ground.

It is not intended to limit this invention to the exact shape shown for the clamps, or to the exact number of shields to the round of the conduit.

The space between the rounded ends of the sections may be filled or wound in with any water-proof insulating material, as represented in Fig. 1, near the right, where the shields are broken out.

The wires having the sections thereon may be reeled off into a ditch and the shields be thereafter applied thereto to complete the conduit.

I claim—

1. A conduit for electric wires or cables, the same consisting of a series of sections abutted together end to end and a series of surrounding shields held in place thereon by clamps, to operate substantially as described.

2. A conduit for electric wires or cables, the same consisting of a series of sections cut away externally to form air-spaces and abutted together end to end and a series of surrounding shields held in place thereon by clamps, to operate substantially as described.

3. A conduit for electric wires or cables, the same consisting of a series of sections abutted together end to end and a series of surrounding shields surrounding the sections and having their ends laid to break joints and held in place thereon by clamps, to operate substantially as described.

4. A conduit for electric wires or cables, consisting of a series of internal sections and surrounding external sections and a series of non-communicating air-cells formed between said sections, substantially as described.

In testimony whereof I have signed my name to this specification in the presence of two subscribing witnesses.

WILLIAM VOGLER.

Witnesses:
BERNICE J. NOYES,
A. S. WEIGAND.